INVENTORS
*John F. Johnson*
*Donald Reiser*
*Glenn S. Ovrevik*

July 9, 1968     J. F. JOHNSON ET AL     3,391,882
ERECTABLE STRUCTURE FOR A SPACE ENVIRONMENT
Filed March 11, 1964     5 Sheets-Sheet 2

INVENTORS
John F. Johnson
Donald Reiser
Glenn S. Ovrevik

INVENTORS
*John F. Johnson
Donald Reiser
Glenn S. Ovrevik*

July 9, 1968     J. F. JOHNSON ETAL     3,391,882
ERECTABLE STRUCTURE FOR A SPACE ENVIRONMENT
Filed March 11, 1964     5 Sheets-Sheet 4

INVENTORS
John F. Johnson
Donald Reiser
Glenn S. Ovrevik

INVENTORS
John F. Johnson
Donald Reiser
Glenn S. Ovrevik 3,391,882
ERECTABLE STRUCTURE FOR A
SPACE ENVIRONMENT
John F. Johnson, Donald Reiser, and Glenn S. Ovrevik, Alexandria, Va., assignors to Keltec Industries, Inc., a corporation of Virginia
Filed Mar. 11, 1964, Ser. No. 351,011
14 Claims. (Cl. 244—1)

This invention relates in general to relatively large erectable structures and in particular to such structures adapted for storage in a confined area prior to erection and to means for erecting same in a space environment.

The utility of massive reflective satellite structures in space communication systems has been clearly demonstrated by the passive reflectors which have been sent into orbit heretofore. It is well recognized by those skilled in the art that passive satellite structures offer numerous advantages over active satellite structures in communication applications. More particularly, passive structures may be designed such that they are operative to reflect at any frequency whereas active satellites are necessarily limited to operations at select frequencies or to frequencies within a selected bandpass. Moreover, passive structures having no power requirement, may be operative over extended periods of time well beyond the lifetime of the essential power source in active structures. In addition, passive satellite structures offer unidirectional advantages as well as unlimited multiple use, that is, any number of communications channels may be operative simultaneously at any desired frequency of operation. There are, of course, many other advantages peculiar to the relatively simple passive satellite structure including considerations of weight, cost, reliability, etc.

Passive satellite structures, however, have not been widely accepted to date due to operation difficulties which may be directly relative to their mode of construction. Such structures generally are gigantic in size and because of obvious launch problems must be sent aloft in a small package and then erected in space either by remote control or by event responsive programed means aboard the satellite.

All passive satellite structures known to have been launched to date have employed the balloon principle and have been inflated by gas pressure while in orbit. This gas inflation technique has proven to be satisfactory on a short term basis but the difficulties experienced in maintaining gas pressure under meteoroid bombardment and in maintaining the spherical shape of the structure under Solar radiation pressures have precluded the use of gas filled balloon structures in long term communication satellite applications.

Accordingly:
It is an objet of this invention to provide a passive satellite structure which may be stored in confined area prior to erection.

It is another object of this invention to provide a passive satellite structure of spherical configuration which will maintain its configuration under solar radiation pressures.

It is also an object of this invention to provide a passive satellite structure of spherical configuration which will not be subject to gradual destruction by meteoroid bombardment.

It is still another object of this invention to provide a passive satellite structure of spherical configuration which may be erected in whole or in part by the heat of the solar system.

It is a further object of this invention to provide a passive satellite of spherical configuration which may be erected by means of an electrical energy source.

It is an additional object of this invention to provide a passive satellite structure of spherical configuration which may be erected by internally or externally disposed means.

It is also an object of this invention to provide a reflective microwave structure suitable for use in a variety of different antenna configurations which may be erected in space.

Other objects of the invention will become apparent upon a more comprehensive understanding of the invention for which reference is had to the following specifications and drawings wherein.

Figure 1:
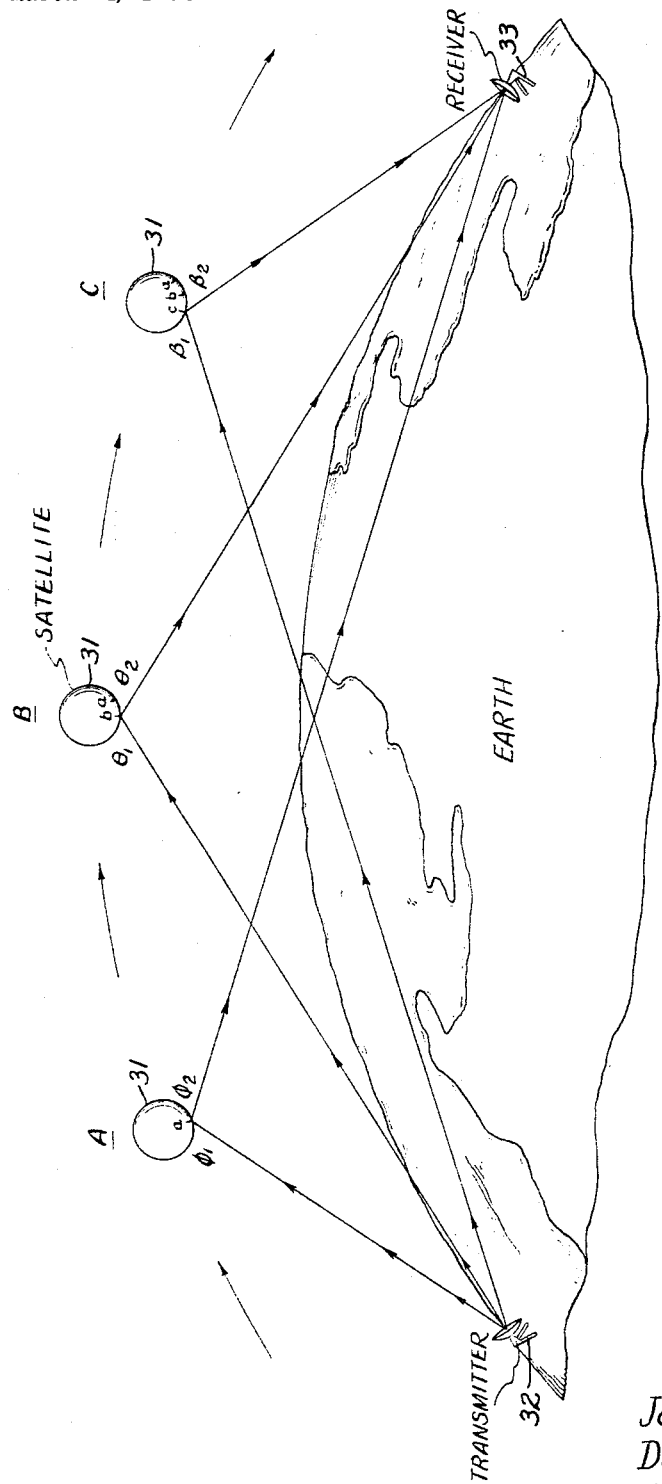
FIGURE 1 is a pictorial illustration of a typical passive satellite application of the device of this invention.

Briefly, the device of this invention is an erectable structure composed of rib sections and a surface covering which conforms to the surface defined by the rib sections. In the passive satellite application described in detail herein, the rib sections define a sphere and the surface of the sphere which is wave energy reflective may be porous or solid as desired. The rib sections are of a selected non-magnetic metal alloy having a unique memory characteristic which enables deformation at temperatures within a selected range and return to their natural configuration when the temperature is changed to another selected range. Various means are employed for changing the thermal conditions of the rib sections.

Referring now to the drawing in more detail:

FIGURE 1 depicts a passive satellite communication network in which the exemplary embodiments of this invention disclosed herein may be utilized. In the illustrations of FIGURE 1, a spherical satellite 31, which may be 150 feet in diameter, for example, is shown at three points in its orbit A, B and C together with microwave transmitter 32 and microwave receiver 33. It will be appreciated that wave energy from transmitter 32 will be reflected in a unidirectional manner by the spherical surface of the satellite 31. Considering a single communication link between the transmitter 32 and receiver 33, wave energy from transmitter 32 incident on the sphere 31 at point $a$ at an angle of incidence of $\varphi_1$ measured with respect the tangent at point $a$, is reflected at a like angle of reflection $\phi_2$ to the receiver 33. Likewise, wave energy directed to the sphere 31 at a subsequent position in the orbit, B, is incident at point $b$ with an angle of incidence $\theta$, and is reflected at a like angle of reflection $\theta_2$ to the receiver 33. Similarly, wave energy directed to the sphere 31 at a later position in the orbit, C, is incident at point $c$ with an angle of incidence $\beta_1$ and is reflected at a like angle of reflection $\beta_2$ to the receiver 33. It will be appreciated that it is vitally important in this variety of space communications system that the reflective surface have a uniform curvature such that the reflective path may be accurately determined per each position in orbit with respect the transmitter. By use of a uniform curvature structure, a true sphere, the effect of indeterminate orientation, tumbling or the like, may be totally ignored, since accurate determination is essentially a geometric consideration.

Figure 2:
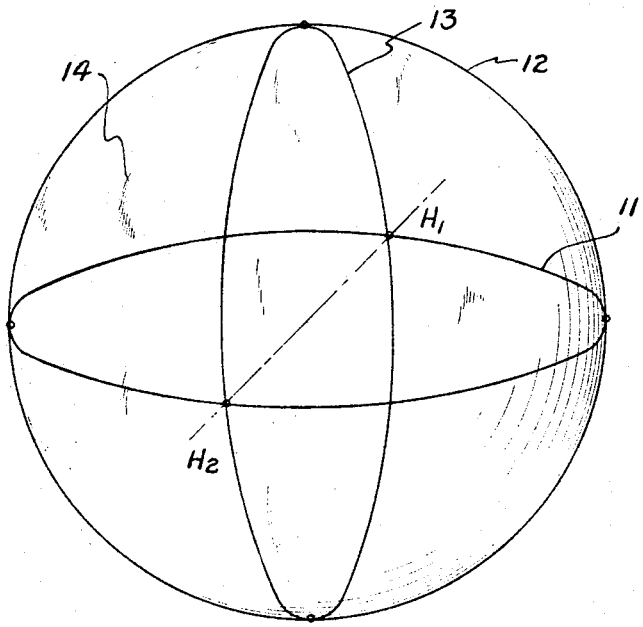
FIGURE 2 is a showing of a first embodiment of the device of this invention in its erect condition.
Figure 3:
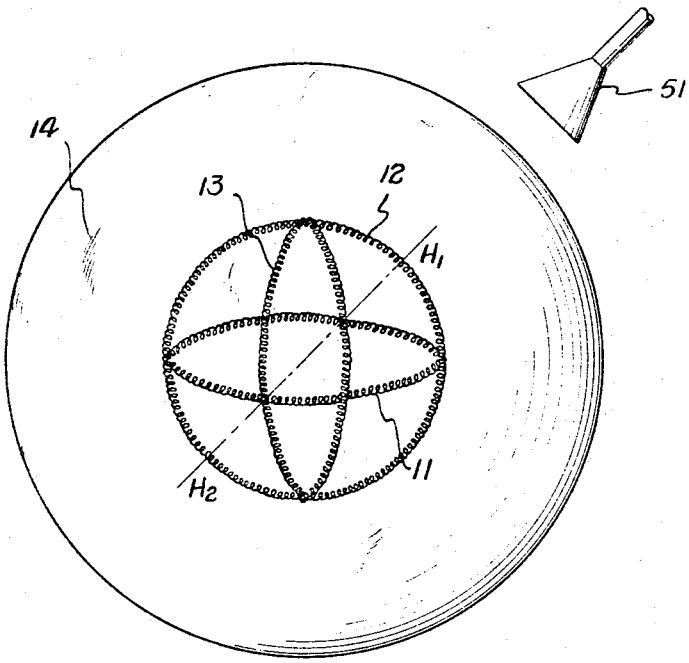
FIGURE 3 is a showing of the embodiment of FIGURE 2 prior to erection.

FIGURES 2 and 3 are illustrative of a first embodiment of the device of the present invention whereby a true sphere satellite configuration is obtained. In FIGURE 2, a preferred embodiment is shown in erect condition with the three orthogonal planes of the sphere defined by circular rib sections 11, 12 and 13. For purposes of correlation with the showing of the embodiment before erection, an axis $H_1$–$H_2$ is shown in the planes of the circular rib sections 11 and 13. A covering which may be vinyl with a metallic film deposited thereon or a metallic mesh is indicated at 14. It will be appreciated that this covering 14 completely encompasses the rib sections 11, 12 and 13 in this embodiment.

In accordance with the teaching of this invention, one or more (preferably all) of the rib sections 11, 12 and 13 is made of a nickel-titanium alloy from a family to be described in detail hereinafter, characterized by a unique "natural" configuration memory which predicates a return to its predetermined "natural" form upon subjection to a selected thermal change. The rib sections 11, 12 and 13 are shown in their predetermined "natural" form in FIGURE 2.

It has been found that rib sections made of the nickel-titanium alloy described above may be deformed, within reasonable limits, at temperatures within a selected range, for example below 65° C. FIGURE 3 shows a deformation wherein each of the rib sections 11, 12 and 13 is coiled upon itself and a greatly reduced rib section unit is obtained. For purposes of illustration, the metallic envelope covering 14 is shown in its full size spherical form as in the erect embodiment of FIGURE 2. It will be appreciated, of course, that in actual practice the metallic envelope covering 14 would be in close proximity to the rib section unit and would be strategically folded to avoid rupture of the covering 14 as the rib section unit is restored to its "natural" form in accordance with the teaching of this invention.

Further, it will be appreciated that the coiled deformation of the rib sections in FIGURE 3 is merely indicative of one type of deformation and that other deformations are within the purview of this disclosure. Moreover, an intermediate state of coil deformation is shown in FIGURE 3 merely for purposes of clear illustration and much more extensive coil deformation might be employed in an operative embodiment of the device.

A heat source 51, which is representative of a wide variety of artificial and natural heat energy sources, is disposed in external relation to the satellite structure in the FIGURE 3 showing. For example, the heat source 51 might be an electrical heat generation means, an atomic or chemical heat source or in selected applications, the solar radiation of the sun might be utilized. It is recognized, of course, that more than one heat source may be utilized, if desired, and that in such instance, at least one heat source may be internally disposed to generate heat within the satellite structure.

It will be recognized that the structure shown in FIGURE 3 may be greatly reduced and that by techniques perfected in prior passive satellite projects, or by new and yet unforeseen techniques, the metallic envelope and its associated rib section structure may be readily confined in, for example, a conventional satellite package cylinder three feet in diameter and two feet in height.

In operation, the conventional passive satellite package cylinder containing the erectable structure of this invention would be projected into orbit by standard rocketry procedure and upon attaining an orbit the cylinder would be opened or thrown off and the structure would be subjected under controlled conditions to a selected thermal change such that the rib structure would return to its "natural" configuration and in this manner would expand the metallic envelope 14 to its full spherical configuration.

Figure 4:
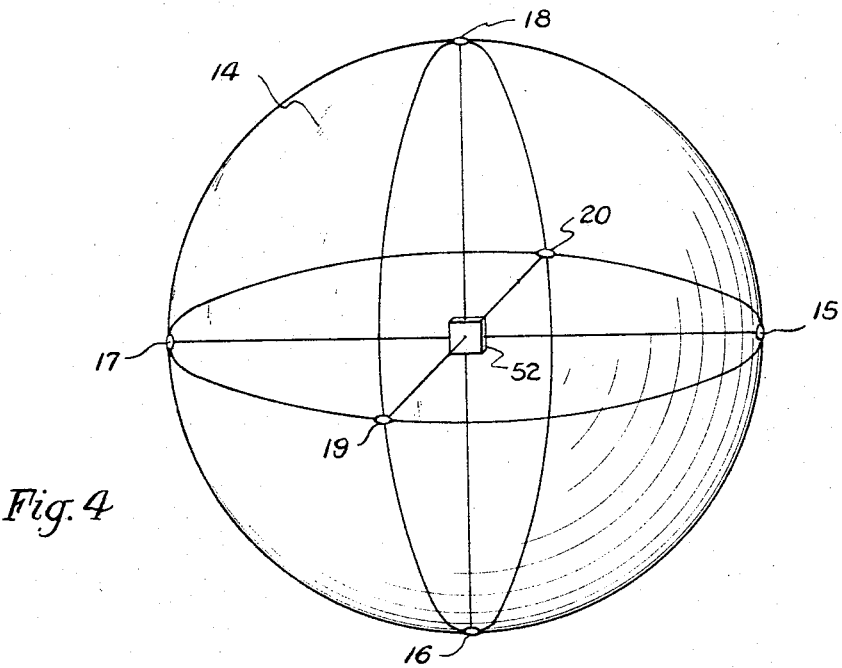
FIGURE 4 is a showing of a second embodiment of the device of this invention in its erect condition.
Figure 5:
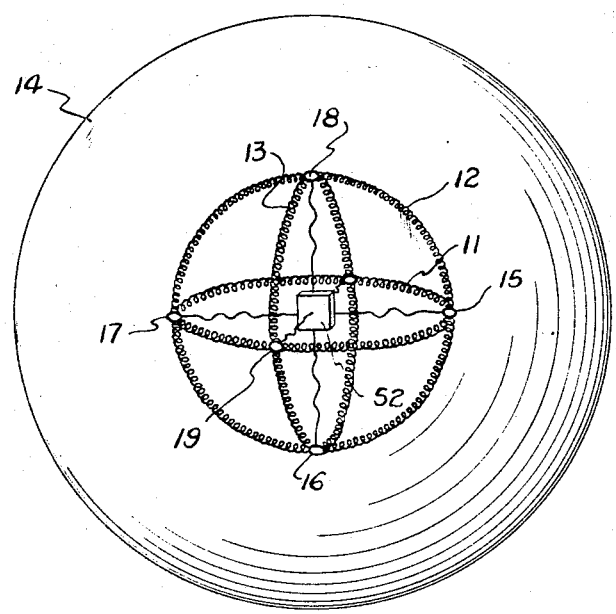
FIGURE 5 is a showing of the embodiment of FIGURE 4 prior to erection.

FIGURES 4 and 5 are illustrative of a second embodiment of the device of the present invention which is directly related to the embodiment of FIGURES 2 and 3 in basic rib section orientation. In this embodiment, however, each of the nickel-titanium alloy rib sections 11, 12 and 13 comprises four separate rib segments which are mechanically and/or electrically joined at respective cross over joints by means of flexible connection means 15, 16, 17, 18, 19 and 20. An electrical energy source 52 is shown connected to each of the connection means such that selected segments of each of the rib sections 11, 12 and 13 may be energized simultaneously or in any prescribed order.

As discussed above in reference FIGURE 3 of the first disclosed embodiment, the nickel-titanium alloy rib segments of each rib section may be coiled upon themselves as shown in FIGURE 5 or in any other manner such that the rib structure package may be reduced in size. It will be appreciated that the flexible connection means 15–20 not only facilitate a more refined folding of the rib sections but also afford a programmed incremental erection by which selected rib segments may be energized partially or wholly by control of the magnitude and/or period of application of electrical energy from the source 52.

Figure 6:
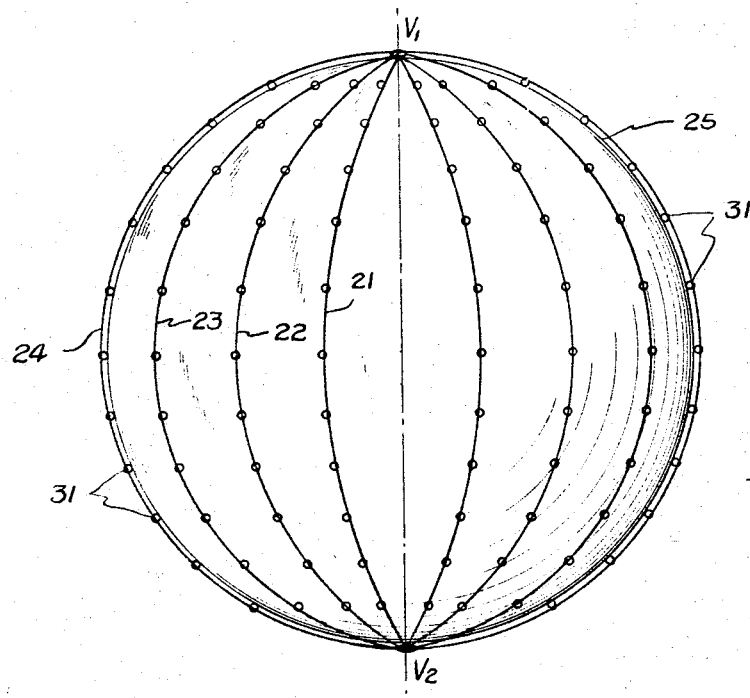
FIGURE 6 is a showing of a third embodiment of the device of this invention in its erect condition.
Figure 7:
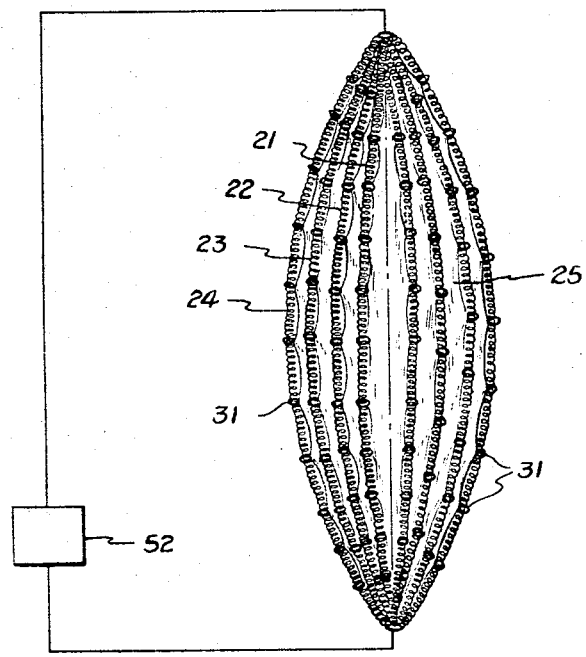
FIGURE 7 is a showing of the embodiment of FIGURE 6 prior to erection.

FIGURES 6 and 7 are illustrative of a third embodiment of the device of this invention wherein a plurality of circular rib sections as indicated at 21, 22, 23 and 24 in FIGURE 6 are disposed about a common axis indicated at $V_1$–$V_2$. In the embodiment of FIGURE 6 the metallic envelope 25 is disposed within the ribbing structure and is attached to the rib sections by means of ring loop coupling, or the like, as indicated at 31.

FIGURE 7 shows the embodiment of FIGURE 6 in a prior to erection state wherein the centrally disposed envelope is collapsed within the nickel-titanium alloy rib sections 21, 22, 23 and 24 which are coiled upon themselves as in the first and second embodiments.

It will be noted that this embodiment is particularly adaptable to parallel energization of the rib segments by the electrical energy source 52 which may be disposed outside the sphere, if desired, where it may be cast off once the sphere has been erected.

The embodiment of FIGURE 6 is particularly adaptable to elongated tubular payload packaging.

Figure 8:
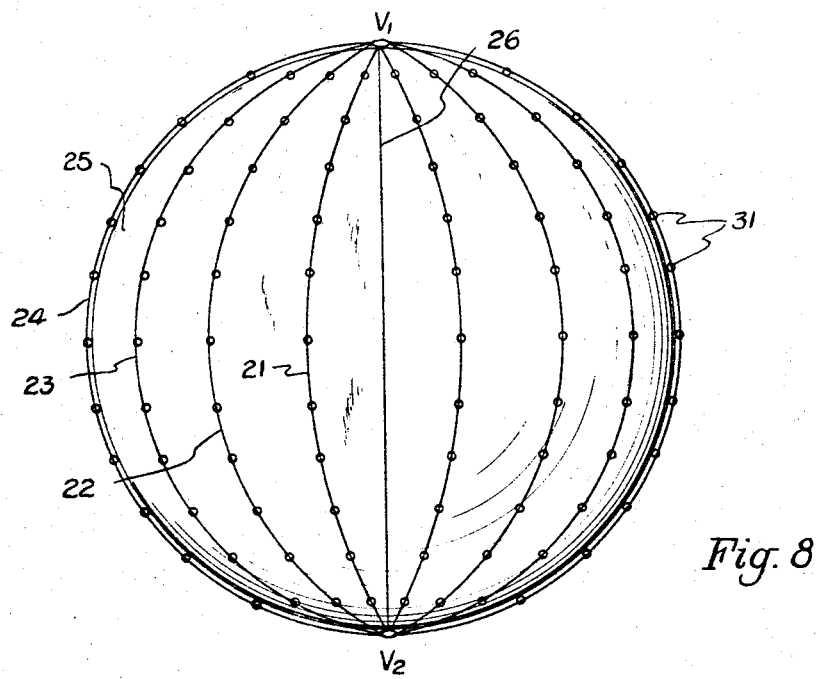
FIGURE 8 is a showing of a fourth embodiment of the device of this invention in its erect condition.
Figure 9:
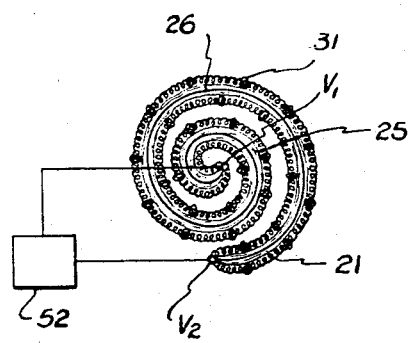
FIGURE 9 is a showing of the embodiment of FIGURE 8 prior to erection.

FIGURES 8 and 9 are illustrative of a fourth embodiment which is related to the third embodiment disclosed herein. As shown in FIGURE 8, this embodiment incorporates an axial member which like the rib sections 21, 22, 23 and 24, is also made of a nickel-titanium alloy having the unique memory characteristic described herein.

The pre-erection showing in FIGURE 9 has been simplified for purposes of illustration. In FIGURE 9, one rib section 21, the axial member 26, and the centrally disposed envelope 25 are shown in a coiled form with the electrical energy source connected to energize the rib sections and the axial member 26. In accordance with this embodiment, the source 52 is adapted to energize the axial member first and then to energize the rib sections 21, 22, 23 and 24 in parallel as in the third embodiment disclosed herein. It will be appreciated that the axial member 26 may be energized in selected increments, if desired, and that this may be accomplished by selective energization of the top layer of the folded satellite package to unfold one layer at a time, such as by directing an externally disposed heat source of the variety shown in FIGURE 3 at the top layer of the package.

As mentioned previously, a porous envelope may be utilized in the several exemplary embodiments. Such an envelope might consist of a nylon netting having a mesh of selected dimension, dependent upon the intended frequencies of operation which has been metallized by depositing or other techniques. This mesh type of envelope has numerous advantages over the solid vinyl envelope most notable of which is the considerable reduction in weight which it affords.

The nickel-titanium alloy utilized for the rib section elements in each embodiment and the axial member element in the embodiment of FIGURE 8 may be one of a series of such alloys which in relatively thin sections exhibit rapid and significant gross dimensional changes when thermally energized. Such alloys may contain nominally 55 weight percent nickel (55.4) and may exist as a single-phase (TiNi) material or as a multistructural material. It has been found that in the 55 weight percent range mechanical deformation promotes the formation of the $Ti_2Ni$ and/or $TiNi_3$ type structures while heating above 65° C. tends to restore the TiNi structure. Since each of these atomic structures has an associated volume; transformation from TiNi to $Ti_2Ni$ and/or $TiNi_3$ and back to TiNi can be accomplished by a change in thermal condition.

In practical terms, a piece of straight wire of the above described nickel-titanium alloy may be coiled about a pen or pencil with the ends of the wire being restrained against relative rotation about the longitudinal axis, and this deformation will provide the formation of some $Ti_2Ni$ and $TiNi_3$ structures. If the wire is then heated above 170° F. such as by immersing in a cup of hot coffee, it will return quickly to its original straight form due to the dimensional changes resulting from transformation of the $Ti_2Ni$ and $TiNi_3$ structures back to TiNi. It has been found that if the wire is not coiled too tightly or bent sharply, this transformation may be repeated indefinitely.

Nickel-titanium alloys of the variety intended for use in the device of this invention have been tediously investigated by Government scientists at the U.S. Naval Ordnance Laboratory in Silver Spring, Md. The results of their efforts have been published in various scientific journals including the Journal of Applied Physics, vol. 34, No. 5.1475–1477, May 1963. The purview of this disclosure extends to the use of all the various thermal responsive alloys referred to, in general or otherwise, in the above cited Journal of Applied Physics article, and its respective citations, which may find utility in the thermally controlled erection of structures in accordance with the teaching of this disclosure. For purposes of this disclosure, the "natural" configuration of this unique nickel-titanium alloy denotes the configuration instilled in the alloy during the forming process by high temperature or other techniques to which the alloy seeks to return upon a change in thermal energization.

It is recognized that each of the several embodiments exemplarily disclosed herein may necessitate supplemental ribbing-interconnection in order to insure a true spherical configuration and such interconnection is clearly within the purview of this disclosure. More particularly, it is within the purview of this disclosure to employ supplemental ribbing interconnections, as required, which may be nickel-titanium alloy sections or otherwise.

Furthermore, it will be appreciated that irrespective of the ribbing structure, the metallic envelope which conforms to the surface defined by the ribbing structure may be disposed either within or without the ribbing structure in the exemplary embodiments.

It is understood that the nickel-titanium rib sections in the several embodiments disclosed herein may have any suitable cross sectional configuration and it is not necessary that a conventional circular or rectangular cross-section be employed.

Moreover, this invention is not restricted to structures of spherical configuration as exemplarily described and is suitable for operation in accordance with the teaching herein for the erection of structures of peculiar or conventional configurations including paraloid or hyperabolic. Obviously, this invention is readily adaptable to other than space erection applications and it has been found to have considerable utility in the erection of consumer goods which are distributed in partially assembled form. For example, cardboard structures which may be intended for container use or otherwise may be converted from a flat folded structure into a box like structure by the application of heat from a heat source comparable to a light duty hair dryer of the type commonly utilized to dry ladies hair.

In addition, it is understood that this invention is directed not only to the erection of structures wherein the segments made of thermal responsive alloy serve as the sole structural support upon erection but also to those structures wherein other structural means are positioned by the segments of thermal responsive alloy and the last said segments may or may not afford any structural advantage in the assembly after erection.

Finally, it is understood that this invention is only to be limited by the scope of the claims appended hereto.

What is claimed is:

1. An erectable structure of selected configuration and adapted for storage in a confined area prior to erection comprising a plurality of collapsible structural support members, at least a portion of said plurality of support members being of a metal alloy having substantially the thermally responsive natural configuration memory characteristic exhibited by 0.02 inch diameter wire sections of nickel-titanium alloy containing approximately 55.4 weight percent nickel, means interconnecting said structural support members such that said selected configuration is defined thereby when said structural support members of said alloy have their natural configuration, and means for changing the thermal condition of said support members by suppyling heat whereby said erectable structure will assume the desired selected configuration from an initial deformed condition.

2. An erectable structure as defined in claim 1 wherein said selected configuration has a selected center line and said portion of said plurality of support members includes central support means of said metal alloy.

3. An erectable structure as defined in claim 1 wherein said means interconnecting said support members includes a collapsible surface adapted to be supported by said plurality of support members.

4. An erectable structure as defined in claim 3 wherein said selected configuration has a selected center line and said portion of said plurality of support members includes central support means of said metal alloy.

5. An erectable structure as defined in claim 4 wherein said collapsible surface is contained within said selected configuration.

6. An erectable structure as defined in claim 5 wherein said collapsible surface and said central support means are adapted for folding in coadjacent relation such that said collapsible surface will unfold as said central support means returns to its natural configuration in response to thermal energization.

7. An erectable structure as defined in claim 6 wherein said central support means includes electrical energy source means adapted to change the thermal conditions thereof.

8. An erectable structure of selected configuration and adapted for storage in a confined area prior to erection comprising a plurality of metallic rib sections, each of said rib sections being of an alloy having substantially the thermally responsive natural configuration memory characteristic exhibited by 0.02 inch diameter wire sections of nickel-titanium alloy containing approximately 55.4 weight percent nickel, means interconnecting said rib sections such that said selected configuration is defined thereby when said rib sections are in their natural configuration, and means for changing the thermal condition of said support members whereby said erectable structure will assume the desired selected configuration.

9. An erectable structure as defined in claim 8 wherein said rib sections are nickel-titanium alloy.

10. An erectable structure as defined in claim 8 wherein said rib sections are nickel-titanium alloy containing approximately 55.4 weight percent nickel.

11. An erectable structure as defined in claim 8 wherein said means for changing the thermal condition is disposed within said structure.

12. An erectable structure as defined in claim 8 wherein said means for changing the thermal condition is disposed outside said structure.

13. An erectable structure as defined in claim 8 wherein said means for changing the thermal condition is an electrical energy source adapted to energize said rib sections by passage of electrical current therethrough.

14. An erectable structure as defined in claim 13 wherein said rib sections are made up of separate and distinct rib sections segments and said electrical energy source is adapted to energize said segments in selected order.

References Cited
UNITED STATES PATENTS

| | | | |
|---|---|---|---|
| 3,169,725 | 2/1965 | Berglund | 244—1 |
| 3,224,000 | 12/1965 | Bloetscher et al. | 244—1 |

FERGUS S. MIDDLETON, *Primary Examiner.*